Figure 1:
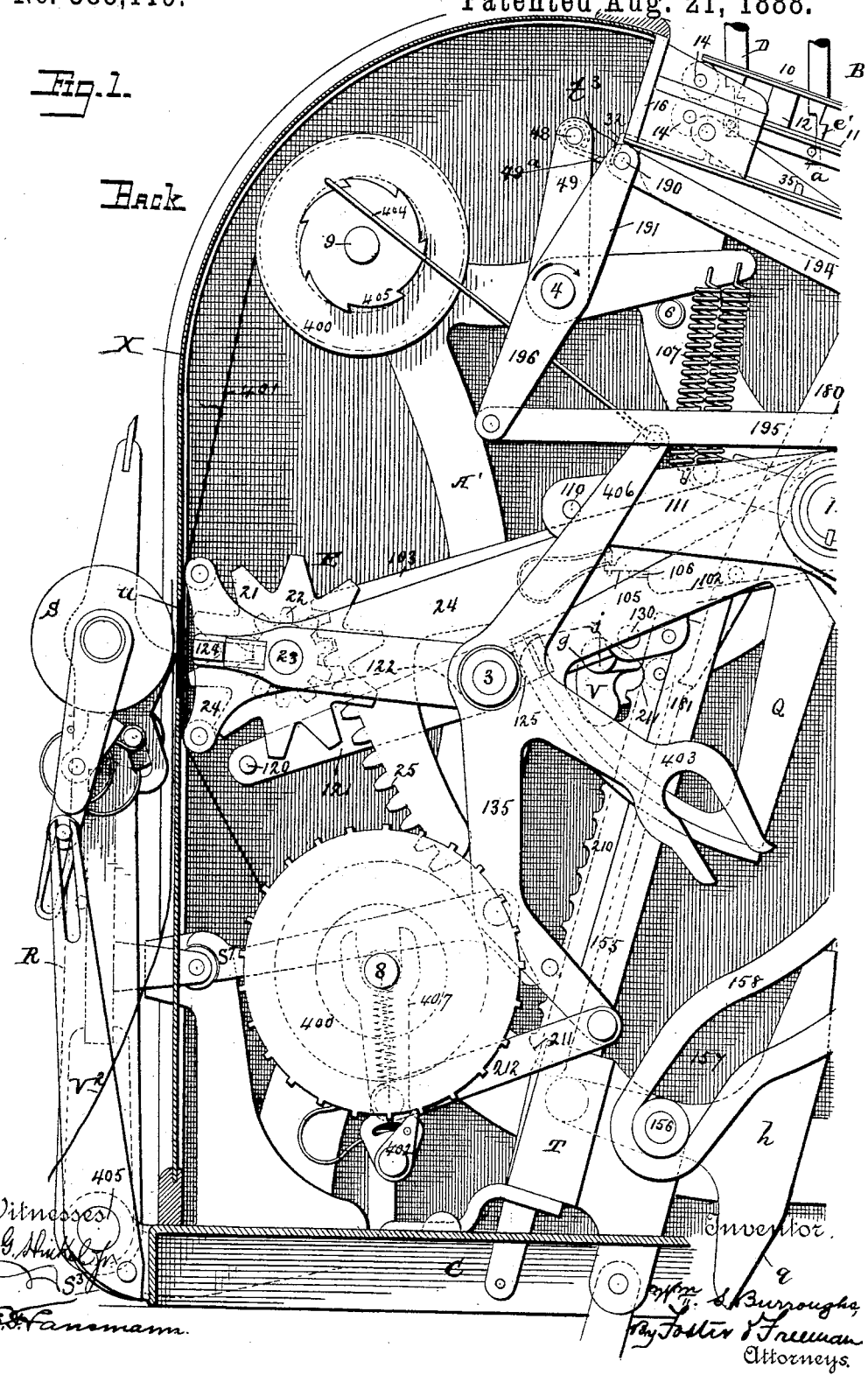

(No Model.) 10 Sheets—Sheet 1.

W. S. BURROUGHS.
CALCULATING MACHINE.

No. 388,119. Patented Aug. 21, 1888.

Witnesses
Jno. G. Hinkel Jr.
A. E. Fansmann.

Inventor
Wm. S. Burroughs
By Foster & Freeman
Attorneys.

N. PETERS, Photo-Lithographer, Washington, D. C.

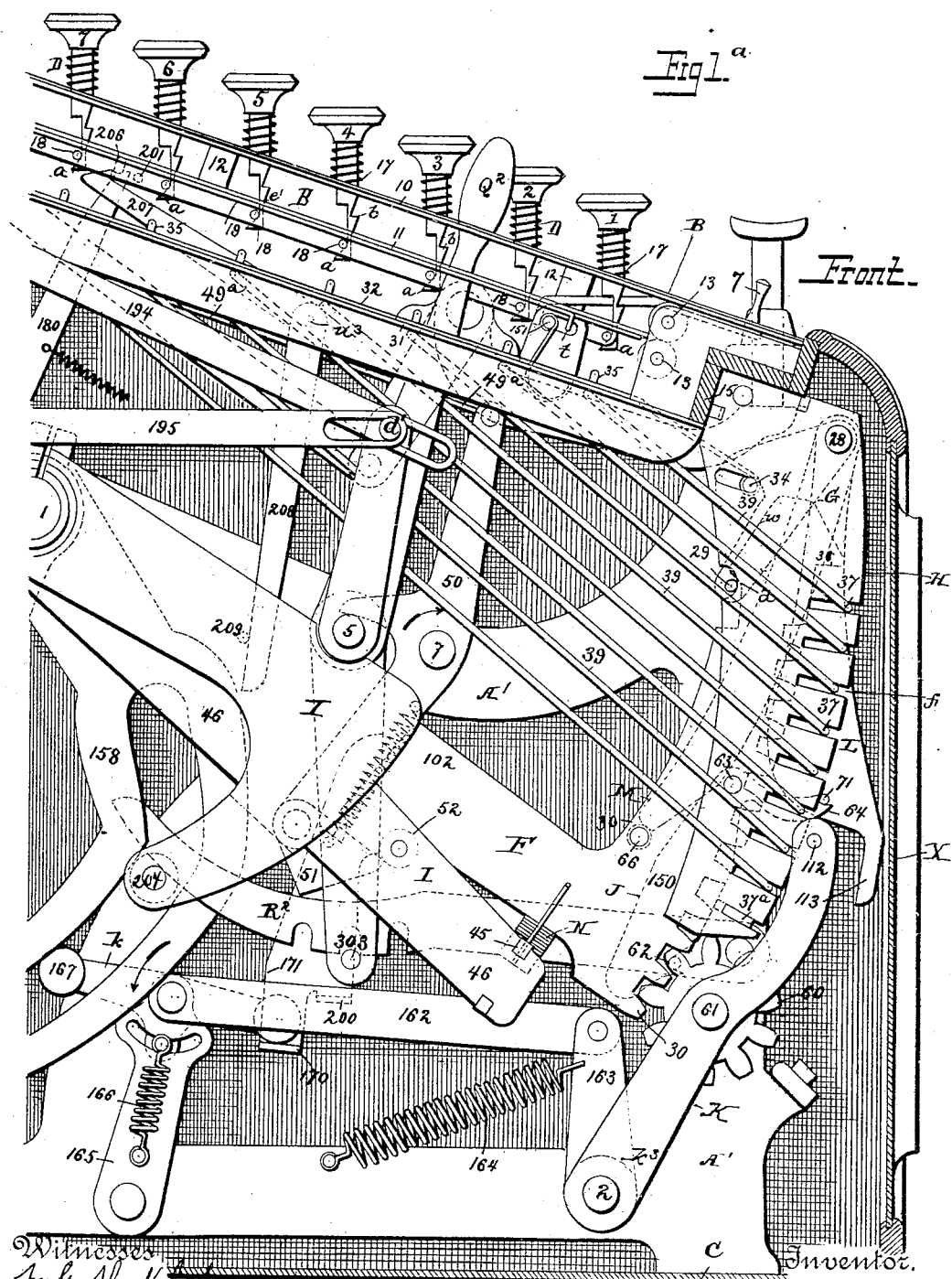

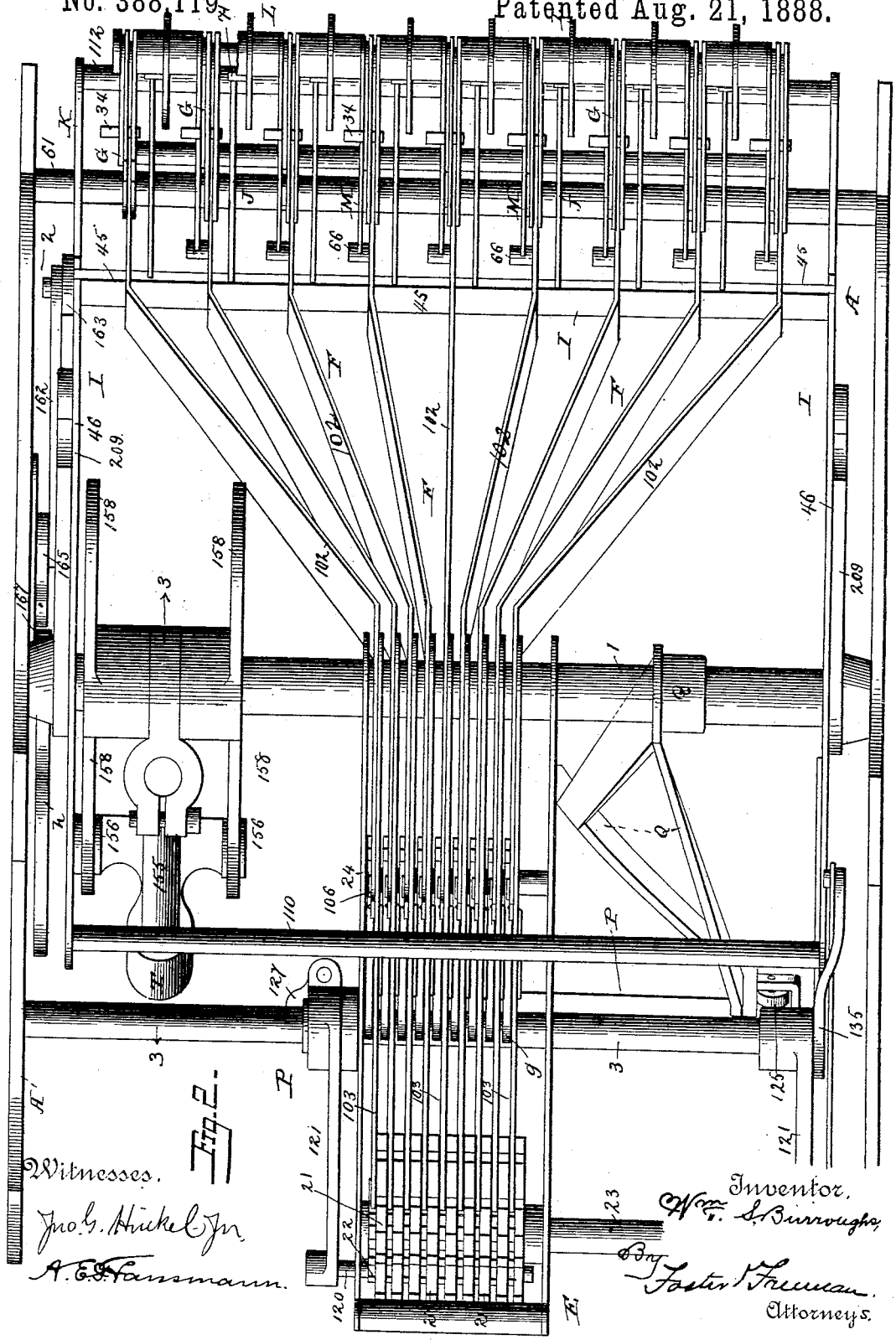

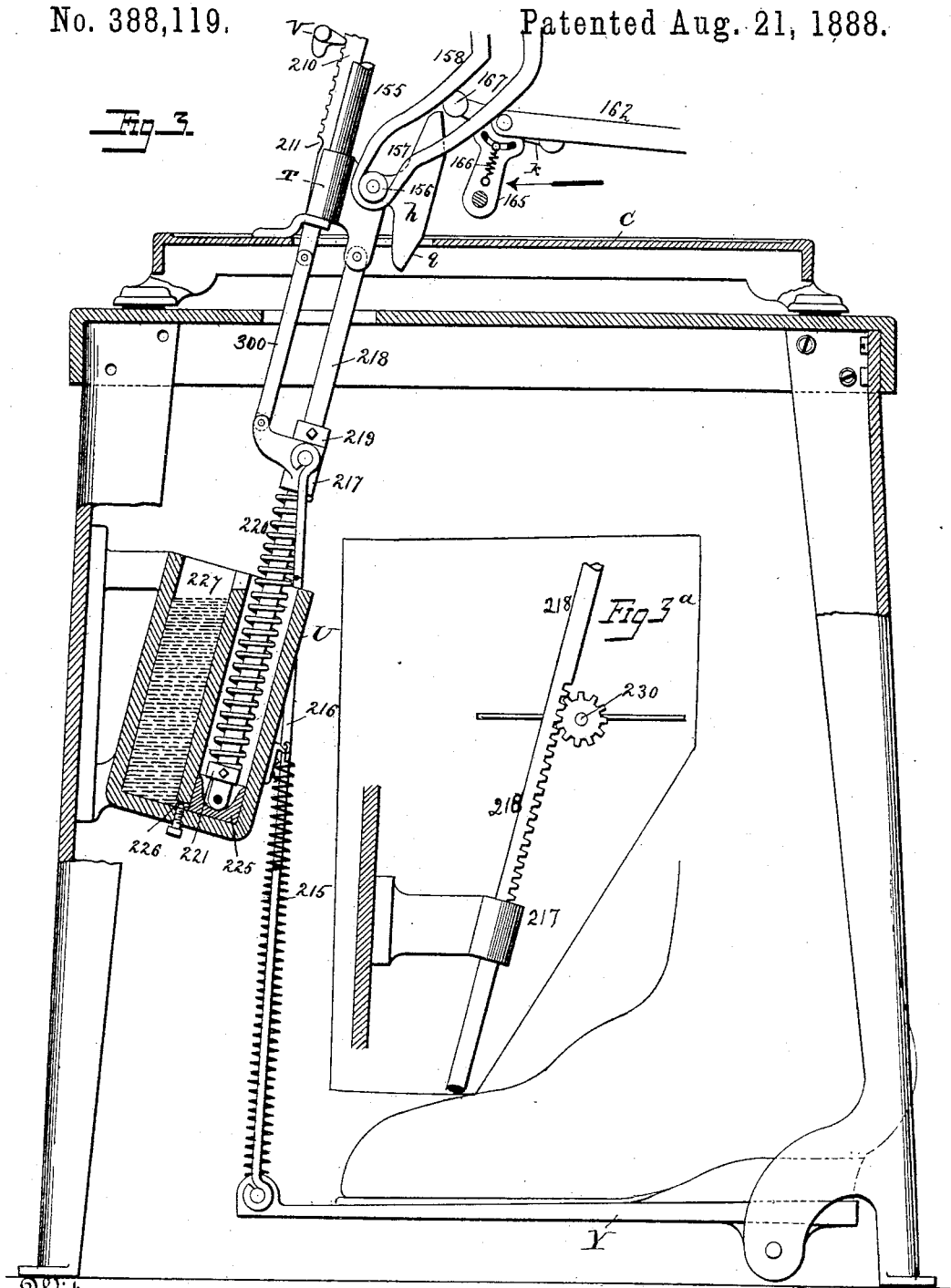

(No Model.) 10 Sheets—Sheet 5.
W. S. BURROUGHS.
CALCULATING MACHINE.
No. 388,119. Patented Aug. 21, 1888.
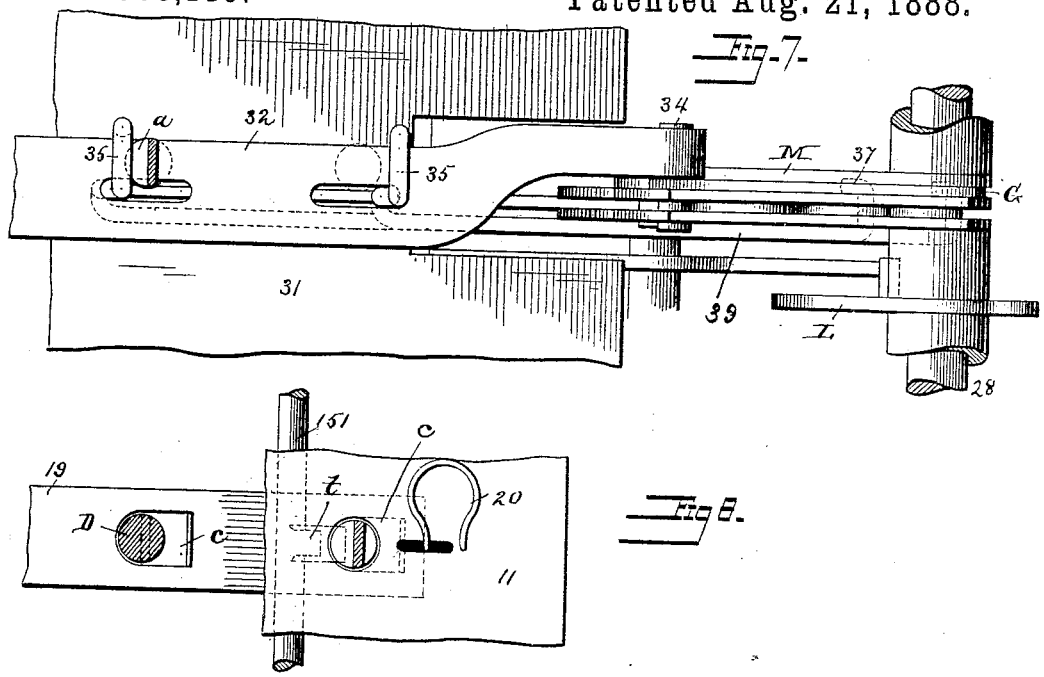
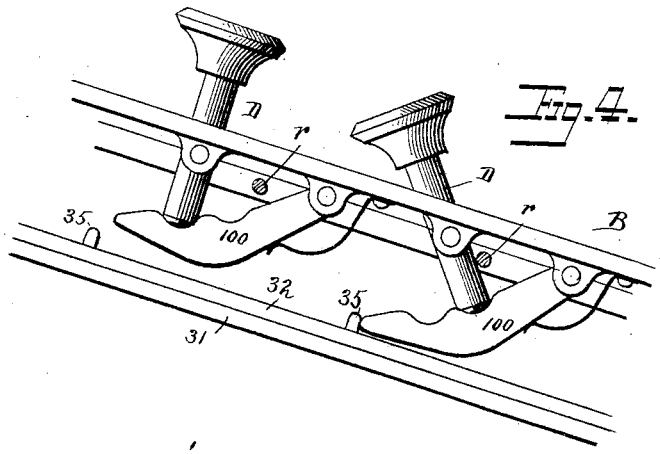
Witnesses.
Jno. G. Hinkel Jr.
H. E. F. Fansmann.
Inventor.
Wm. S. Burroughs
By Foster & Freeman
Attorneys.

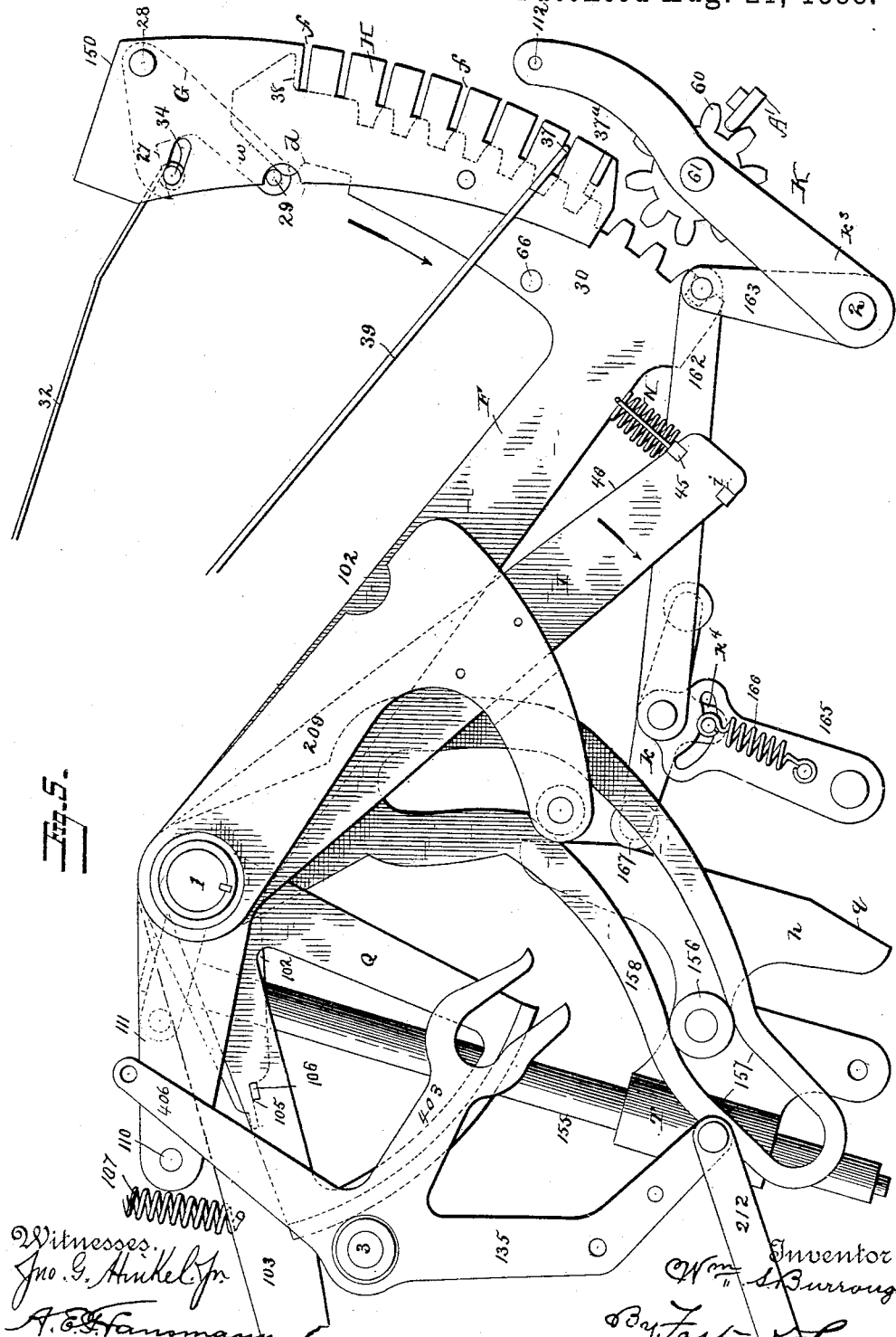

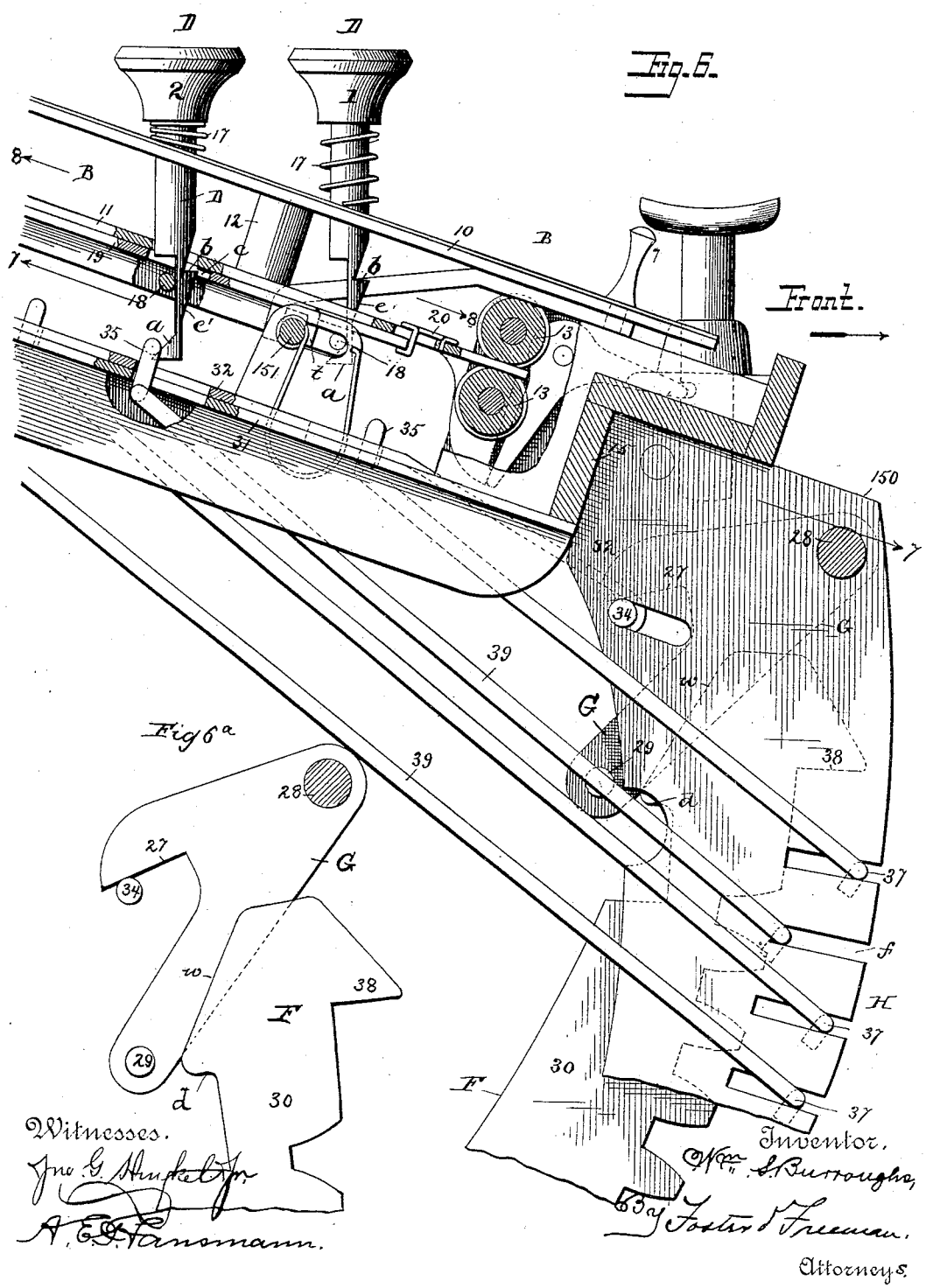

(No Model.) 10 Sheets—Sheet 8.
W. S. BURROUGHS.
CALCULATING MACHINE.
No. 388,119. Patented Aug. 21, 1888.
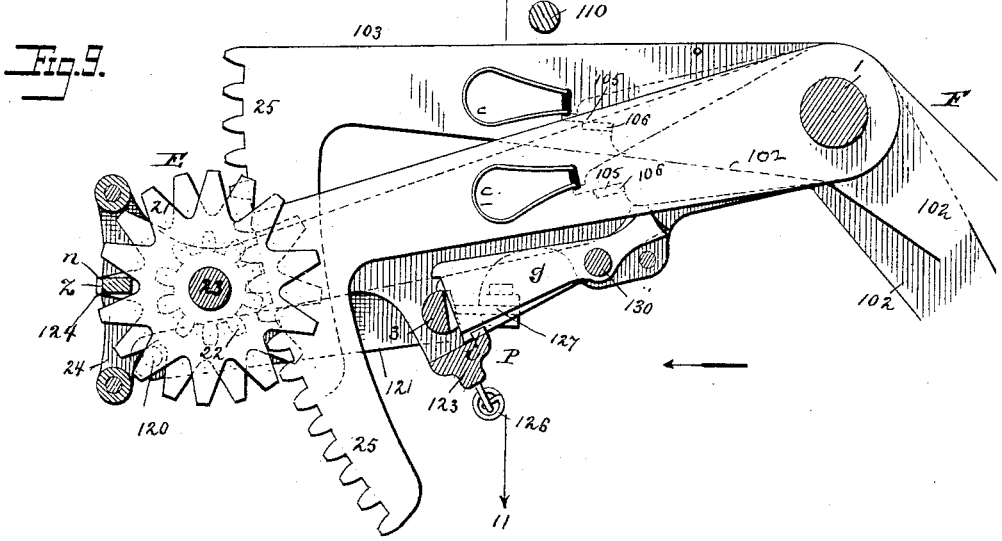
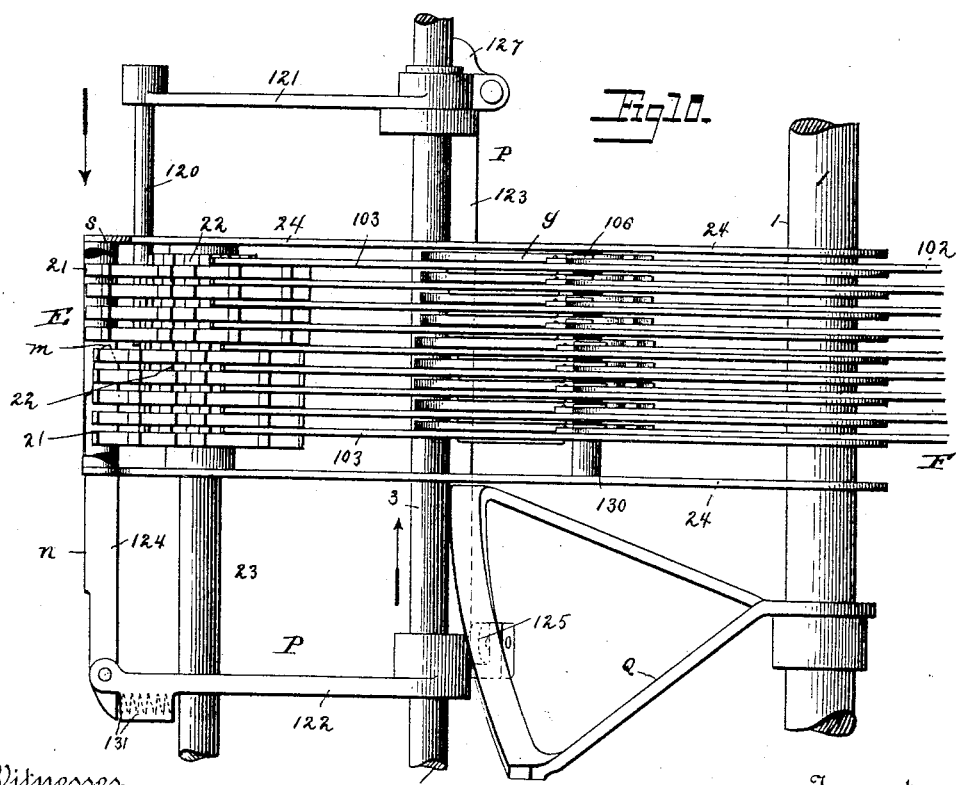
Witnesses.
Jno. G. Hinkel Jr.
A. E. Fansmann.
Inventor.
Wm. S. Burroughs
By Foster & Freeman
Attorneys.

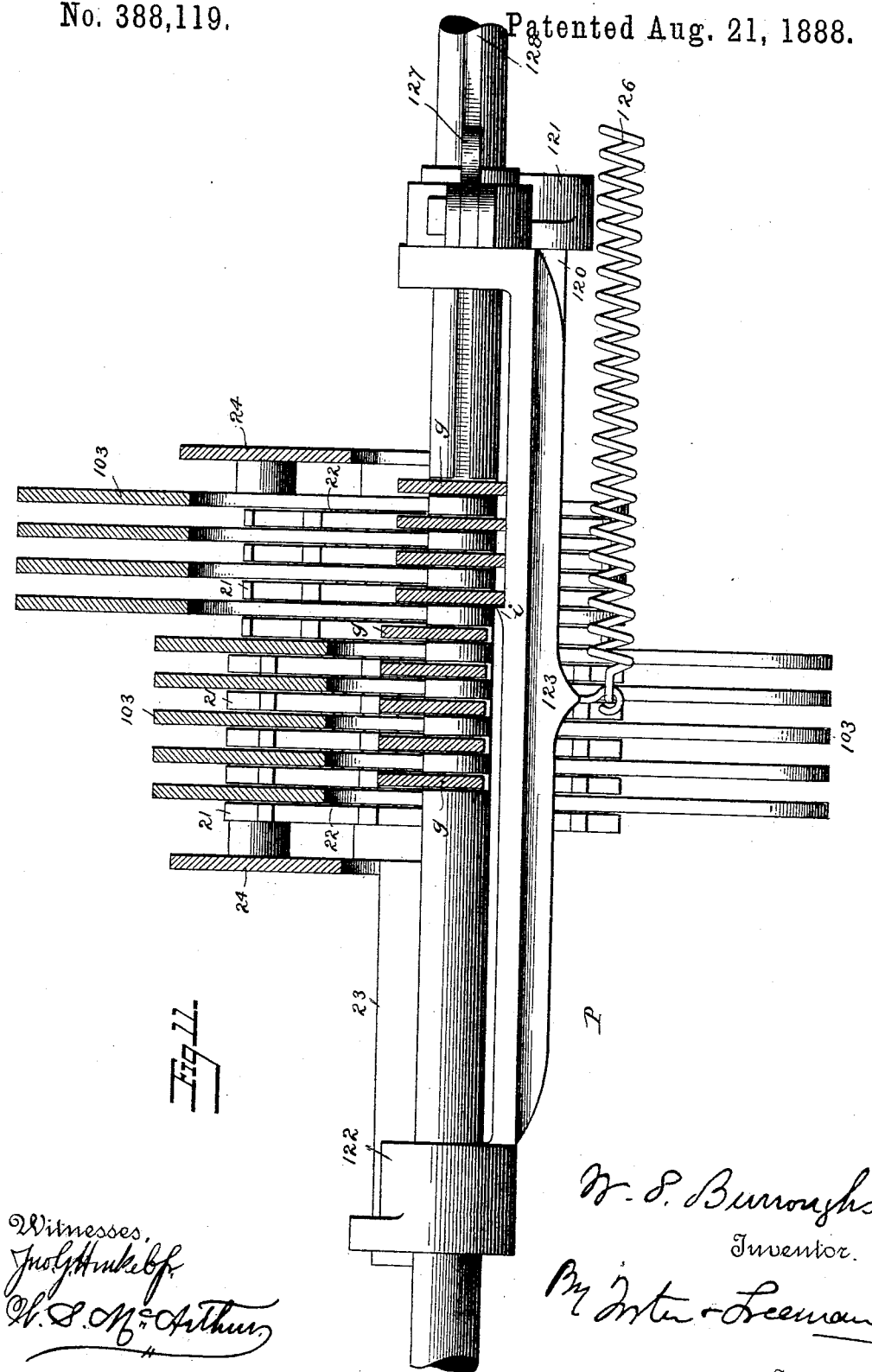

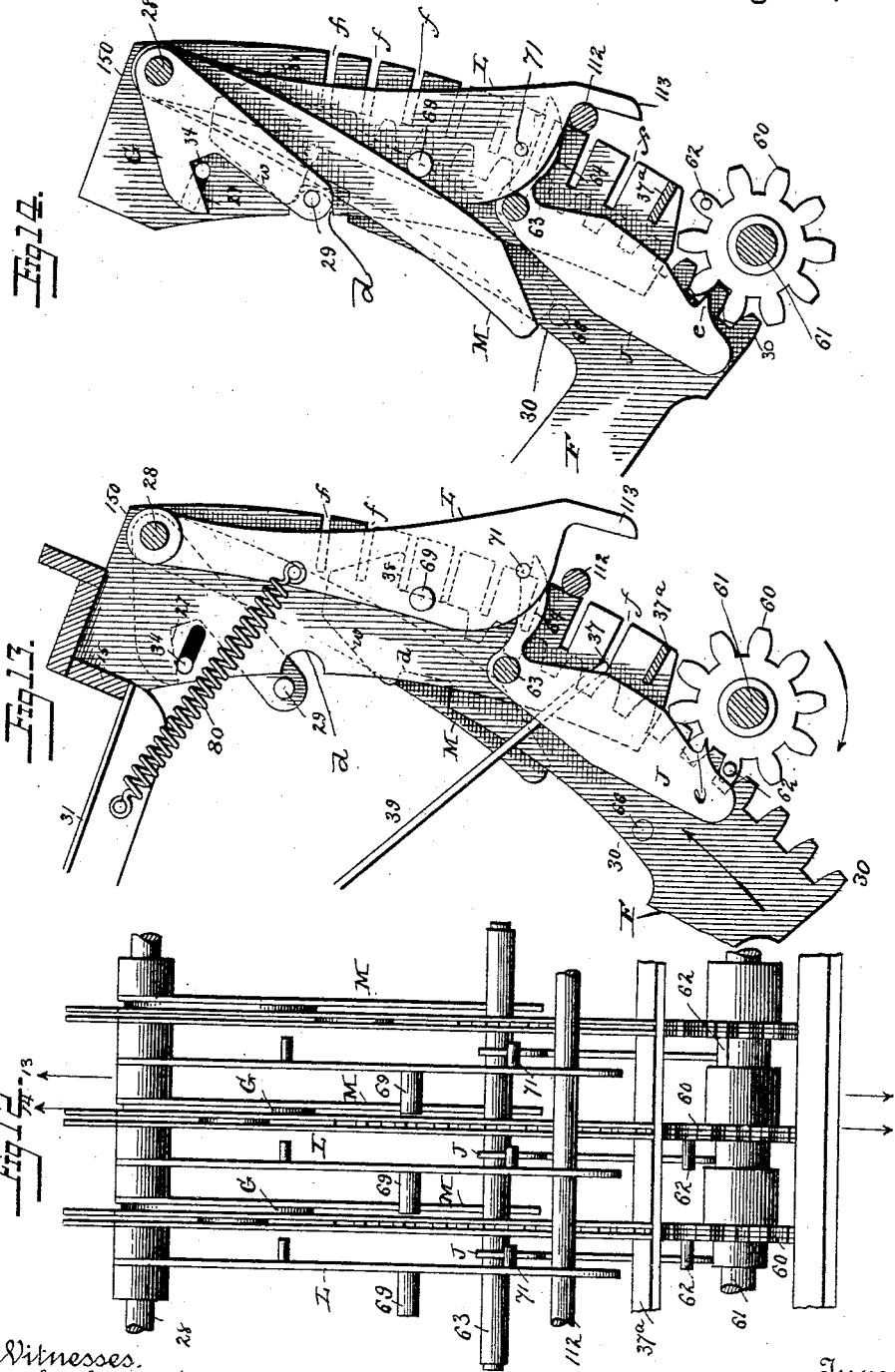

UNITED STATES PATENT OFFICE.

WILLIAM S. BURROUGHS, OF ST. LOUIS, MISSOURI, ASSIGNOR TO THE AMERICAN ARITHMOMETER COMPANY, OF SAME PLACE.

CALCULATING-MACHINE.

SPECIFICATION forming part of Letters Patent No. 388,119, dated August 21, 1888.

Application filed November 30, 1887. Serial No. 256,566. (No model.)

*To all whom it may concern:*

Be it known that I, WILLIAM S. BURROUGHS, a citizen of the United States, residing at St. Louis, in the State of Missouri, have invented certain new and useful Improvements in Mechanical Accountants, of which the following is a specification.

My invention relates to that class of mechanical calculators in which the register wheels or plates are put into recording positions from the action of series of keys set by hand of the operator through intermediate actuating mechanism; and my invention consists in certain novel means for actuating the register-wheels from the keys, as fully set forth hereinafter, and as illustrated in the accompanying drawings, in which—

Figures 1 and 1ª together constitute a part-sectional side elevation of a machine embodying my invention. Fig. 2 is a plan view of part of the apparatus, the key-board and connections being removed; Fig. 3, a sectional elevation on line 3 3, Fig. 2 showing a treadle, governor, and operating-connections for actuating the machine therefrom; Fig. 3ª, a modified brake device; Fig. 4, a view showing a modification of the keys. Fig. 5 is a side view showing the regulator, carrying devices, and part of the register-actuating devices. Fig. 6 is an enlarged part-sectional view, showing part of the key-board, keys, and regulator. Fig. 6ª is a detached view of part of the devices shown in Fig. 6; Fig. 7, a part plan on the line 7 7, Fig. 6; Fig. 8, a part plan on the line 8 8, Fig. 6; Fig. 9, a part side section showing the register and part of the actuating devices. Fig. 10 is a plan view of the parts shown in Fig. 9; Fig. 11, a sectional elevation on the line 11 11, Fig. 9, looking in the direction of the arrow; Fig. 12, a part front elevation of the regulator and carrying devices; Fig. 13, a sectional elevation on the line 13 13, Fig. 12; and Fig. 14 a sectional elevation on the line 14 14, Fig. 12.

Hereinafter I shall designate the series of numeral-wheels as the "register," and refer to the separate wheels as "register-wheels." It will be understood, however, that the register may be printed from, constituting in such case a recorder.

The frame of the machine is of suitable character to support the operating mechanism, hereinafter fully set forth, and, as shown, is provided with side pieces, A A', connected to a base, C, and supporting a sliding key-board, B, Figs. 1, 1ª, 2, 4, and 6, having a slight forward and backward movement, and said side pieces afford bearings for rock-shafts 1 2 3 4 5, rotating shafts 8 9, and support cross stay-rods 6 7.

*The keys.*—The key-board B consists of two parallel separated plates, 10 11, Figs. 1, 1ª, and 6, connected by studs 12 12, and the plate 11 at the front end extends between guide-rolls 13 13, supported by the frame, and at the rear between guide-rolls 14 14, also supported by the frame, so that the key-board can slide back and forth to an extent limited by contact with a cross-plate, 15, at the front and with a cross-plate, 16, at the back.

The key-board supports parallel series of keys, each series having nine separate keys, D, arranged in a line parallel to the side edge of the key-board, and having heads with numbers from 1 to 9 running from the front to the back, and having stems extending vertically through corresponding openings in the plates 10 11, each head resting on a coiled spring, 17, which lifts the key to an extent limited by the contact of a lip, $a$, on the stem with a cross-rod, 18. All the cross-rods 18 extend through flanges on the plate 11, and are carried thereby.

Each key-stem is notched to form a shoulder, $b$, and an inclined edge, $c'$, and the plate 11 carries a series of strips or slides, 19, Fig. 8, one slide below each series of keys, and each slide has an elongated slot, $c$, for the passage of the stem of each of the keys of the series, and a spring, 20, Figs. 6 and 8, tends to force back each slide, so that if any key is depressed to carry the shoulder $b$ below the slide the latter will first be pressed forward by contact with the inclined edge $c'$ and then move back under the action of the spring to a position above the shoulder $b$, thus locking the key in its depressed position. As a result of this construction, if any key of a series is erroneously depressed and then held by the locking device, the depression of a second key of such series, to correct the error, will move forward the slide until the key first depressed is unlocked and rises, after which the second key will be locked in position. After the keys have been depressed to register any desired amount the key-board is pushed back by hand or otherwise, so as to bring the depressed keys into action, as hereinafter described.

I have referred to only one means of moving the key-board after the adjustment of the keys—that is, by sliding it; but it will be evident that it might be otherwise connected movably with the frame, as by hinging it, and supporting it in an elevated position while "setting" or adjusting the keys adjustably supported by said board, and then moving it downward to bring the "set" or adjusted keys into action with the register-operating devices.

The particular apparatus operated by the movable key-board and set-keys may be varied indefinitely, and such key-board and keys may be used in connection with different forms of registers illustrated in other applications I have made for Letters Patent, Serial No. 152,485, filed January 16, 1885; No. 174,593, filed August 17, 1885; and No. 195,583, filed March 17, 1886. I prefer, however, the character of co-operating mechanism which I will now proceed to describe.

*The register.*—The register E, which may be a slight register merely or a printing-recorder, and arranged in any desirable position, is shown as consisting of a series of numbered wheels; but any form of register with segments or sliding numbered plates, &c., may be used. Each wheel 21 of the register, Figs. 2, 9, and 10, is cut away to form radial arms with intervening V-shaped notches, and carries a pinion, 22, at one side, and turns on a shaft, 23, carried by side plates, 24 24, supported by the shafts 1 and 3. Between each register wheel or plate and one of the series of keys intervene what I term "register-actuating devices," which move said register with regulated movements to positions determined by the key, which is set or struck. As shown, each actuating device has a rocking lever, F, consisting of two sections in the form of loosely-connected arms 102 103, Figs. 2, 9, and 10, swinging on the shaft 1, the rear end of section 102 extending to the rear of the shaft 1, and each section 103 is provided at the rear end with a rack, 25, gearing with one of the pinions 22, and co-operating with four main devices—viz., first, a "retainer," which holds it in one position, which I term the "normal" position; second, with the series of keys which release it to permit its automatic movement to register a number; third, with a "regulator," which determines the extent of the lever's movement in accordance with the figure to be brought into position by the register; and, fourth, with a "carrying device," which automatically imparts an additional movement to the next actuating mechanism when the addition of numbers requires it.

It will be obvious that different forms of retainers, releasing devices, regulators, and carriers may be used.

*The retainers.*—In the construction illustrated each retainer G, Figs. 6, 6ª, and 14, consists of a lever swinging on a rod, 28, and having a catch or bearing, 29, in the form of a pin, which engages with a shoulder, *d*, on a rack, 30, connected to or forming a part of the adjacent lever F at the forward end thereof, the lever F having an inclined edge, *w*, that contacts with the bearing 29 when the lever is raised and swings back the retainer until it engages with the shoulder *d*, and thereby holds the lever in position.

In other forms of calculating-machines the retainers are operated directly by the keys; but in the machine now being described, in which the keys are all set before any registering action takes place, the retainers are combined with connections which are operated only on the movement of the key-board after all the keys are set. Thus the frame of the machine supports a slotted plate, 31, parallel to the key-board, and the strips 32 slide on the plate 31, Figs. 6 and 7, each being extended forward and carrying a lateral pin or bearing, 34, on which bears an inclined shoulder, 27, Figs. 6 and 6ª, of the retainer G. Each strip 32 is moved at times by the operating eye-studs 35, shown on the rods 39, and each in position to be forward of the stem of the adjacent key D, when the latter is set, so that the forward movement of the key on sliding the key-board will bring each depressed key in contact with one of the studs, and will also carry forward the strip and move the retainer G and release the lever F, which will then drop at the forward end and adjust the register wheel or piece with which it co-operates.

*The regulators.*—The regulator H, which determines the extent to which the lever is dropped, consists, as shown in Figs. 1ª, 5, 6, 12, 13, and 14, of a series of stops, 37, arranged at different heights, and each controlled by one of the keys of the co-operating series, so as to be set in position to be struck by a shoulder, 38 on the rack 30 of the lever F, Figs. 1ª, 5, 6ª, and 13, as the lever descends after being released. Each stop 37 slides back and forth in one of the coinciding slots *f*, made in a pair of parallel plates constituting a curved stop-bracket, 150, Figs. 5, 6, 13, and 14, pendent from the bar 15. The controlling devices between each stop and the operating-stud 35 consist, as shown, of a rod, 39. This rod 39 may be connected to the stop 37 and stud 35. As shown, it is turned up at the end to form an eye, Fig. 6, extending through slots in the plates 31 32, and constituting the before-named operating-stud 35. When any key of the several series is depressed to contact with the stud 35 on the sliding of the key-board, as before described, the rod 39 and stop 37, connected with that stud 35, are also moved, so as to set the stop, while the retainer G is also moved to release the lever F. After being thus released, the lever falls until its shoulder 38 strikes that stop that has been moved into the path of the said shoulder 38, and as the upper stop is connected to operate with the lowest key and the others are connected in order with the other keys, the depressing of any key of any series will set the stop connected with said key to permit the co-operating lever to fall to a determined extent and turn the register-wheel so much of a revolution as will present to the sight or printing opening the figure on the wheel corresponding to that on the key depressed. The extent of movement of each lever is thus absolutely regulated.

It is not necessary to provide a movable stop, 37, for the upper or "9" key, as a permanent stop, 37ª, Fig. 1ª, at the lower end of each bracket 150 arrests the lever after it is released by the action of the upper key. After the key-board has been pushed back to set the stops and swing the retainers G to release the levers, it is at once released and then slides forward to its first position, leaving the stops 37 set for operation, while the keys are all carried out of direct connection with the stops and can be set by again depressing them, so as to again operate the stops when the board is again moved back, this being done without changing the positions which the register-wheels have been caused to take. As the key-board moves back, a lip, t, on each locking-slide 19 strikes a bar, 151, Figs. 1, 6, and 8, and the movement of the slides is arrested, so that the shoulders b of the keys are carried from below the slide and the keys are released. The keys cannot rise, however, owing to their lips a being hooked into the eye studs 35; but on again drawing forward the key-board, after the stops are set, the lips will be drawn from said studs and the keys will be lifted by the springs 17 to their first position. By extending the studs 35 through slots in the slides 32, and by connecting said studs to the stops 37, the movement of any stud of a series not only moves the slide 32 and swings the retainer, but also simultaneously sets the stop in position to arrest the lever F released by such retainer.

To register an amount indicated by more than one figure, a number of levers, F, will be dropped, corresponding to the number of figures in the amount, after which the levers must be restored to their normal position prior to registering another amount. If the number is to be printed, the printing may now be effected. This restoration is effected by means of a "lifter," I, consisting, as shown, of a cross-bar, 45, Figs. 1ª, 2, and 5, extending below the levers F and actuating devices—as, for instance, two arms, 46 46, Figs. 1ª and 2, hung to the rock-shaft 1 and swinging on or with the same—so that as the shaft is rocked by a suitable lever the bar 45 will be elevated, and striking the under edges of the dropped levers F will raise them until their shoulders d engage with the retainers G, which then lock the levers in their elevated position. As the levers F are restored, the stops 37 are readjusted. This is effected by pushing forward all of the strips 32, either by hand or by actuating mechanism. The latter is shown, and consists of a bar, 48, Fig. 1, carried by arms 49 on the rock-shaft 4, and brought against the ends of the strips 32 by rocking said shaft in the direction of its arrow.

A rod, 49ª, Figs. 1 and 1ª, extends from the bar 48 to the upper end of a lever, 50, which lever 50 swings on the cross-rod 7, and carries at its lower end a spring-actuated cam-dog, 51, Fig. 1ª, which yields as a friction-roller, 52, on one of the arms 46 of the lifter I, strikes the same on the descent of the lifter I, but on the rising of the latter the friction-roller strikes the cam edge of the dog and vibrates the lever 50 in the direction of its arrow, so as to draw forward the rod 49, connecting the lever 50 and bar 48, and carry the bar 48 against the ends of the projected strips 32, and thus automatically move all the strips and restore the stops.

*The carriers.*—Whenever the number accumulated by the action of any one of the series of keys exceeds 9 it is of course necessary to carry the excess to the next column; and for this purpose I combine with the register and with each series of keys, stops, and connections, a "carrier," which operates automatically to permit the next highest register-actuating mechanism to move an additional step whenever the amount accumulated by the preceding mechanism exceeds 9.

Different carriers may be employed, as illustrated in said other applications I have made for Letters Patent; but I prefer to use a modification of that illustrated in my application, Serial No. 195,583, filed March 17, 1886, and which I will now describe.

With the racks 30 at the forward ends of the levers F, Figs. 1ª, 13, and 14, gear carrying pinions 60, turning on a shaft, 61, supported by the arms $k^3$ of a frame, K, that swings on the rock-shaft 2, Figs. 1ª and 5, or supported by any other form of frame, whereby the carrying-pinions can be swung to and from the racks into and out of engagement therewith. Each lever, F, has a stud or bearing, 66, Fig. 1ª, (dotted lines,) and Figs. 13 and 14, which is normally in contact with the lower end of a detent, M, consisting of a lever hung to the cross-rod 28 and resting normally on a cross-pin, 63, extending between the plates of the stop-bracket 150. A striking-lever, L, hung to the cross-rod 28 at the side of the detent M, carries a stud, 69, and also a stud or bearing, 71, normally in contact with the upper arm, 64, of a bell-crank lever or pawl, J, having a shoulder, e, and hung to the stud 63. A spring, 80, tends to draw back each lever L with a striking effect, as set forth hereinafter. The normal positions of these parts just described are shown in full and dotted lines in Fig. 1ª.

Each pinion 60 is provided with a lateral stud or bearing, 62, and in all the operations of the machine (except in drawing off the total)

the pinions 60 are always out of engagement with the rack-levers F on the descent of the latter, as shown in Fig. 5, but are swung inward into gear prior to the lifting of the levers, so that as each dropped lever rises it will turn back each pinion 60, (in the direction of the arrow, Fig. 13,) to an extent proportioned to the extent to which the lever F was dropped.

The various parts described are so arranged that the stud 62, Figs. 12 and 14, of each of the pinions 60 may be brought to contact with one of the pawls J, Fig. 13, and this pawl J, in the position shown in Fig. 13, holds forward one of the levers L, the pin 69 of which is in position (shown in Fig. 12) to strike the detent M of the next higher lever, F. As a result, when one lever, F, moves upward sufficiently to complete a revolution of the pinion geared therewith the stud 62 of such pinion is brought against the next adjacent pawl, J, Fig. 13, swings the latter back to the position shown in Fig. 14, to carry the arm 64 of the pawl away from the stud 71, and releases the lever L, which then moves inward under the action of the spring 80, and by its stud 69 strikes the detent M and carries it away from the bearing 66 of the lever F to the left of that which turned the aforesaid pinion 60. This displacement of the detent M permits the lever F, from which the detent has been removed, to rise one step higher than the other levers, and it will therefore turn its pinion 60 one step farther than would result from any movement of said lever F under the action of its own series of keys. The effect of this is to add 1 to the number registered, as hereinafter described.

As the rigid bar 45 would lift all the levers to a uniform extent, I provide an additional motor device of some kind to automatically carry the levers F, that are capable of further movement to the extent of such movement. Such motors may be differently applied and of different kinds, obvious to any skilled mechanic. As shown, they consist of independent springs N, Fig. 5, arranged upon the bar 45, so as to contact with the levers F and be compressed between the levers and the bar when the latter is at the limit of its upper motion and the levers are held in their normal positions by the detents M; but when any lever F is released, by swinging away the detent M the motor-spring N, bearing on said lever F, moves it automatically upward to the extent necessary to turn the carrying-pinion, geared with the said lever, an additional step.

The turning of the carrying-pinions in one direction by the repeated movements of the levers F has the effect of accumulating on the series of pinions the total sum of all the amounts set upon the keys. This accumulation is not necessarily visible upon the pinions; but the series of pinions is in the position that a series of corresponding register-wheels would occupy if they were substituted therefor; or, in other words, if the ends of the teeth of the pinions were numbered as register-wheels are, (as they might be, if desired,) said pinions would indicate in line a series of figures showing the sum total of all the numbers accumulated by the action of the keys of the key-board.

As a set of registering-wheels at the front of the machine would show only the sum total, I use the separate register E for indicating the separate amounts registered at each single operation, such register also serving to receive and show the sum total when required, as I will now describe.

Assuming that at the beginning of operations the stud 62 of a pinion, 60, is in contact with the shoulder e of the pawl J, as shown in Fig. 1ª, and that the movement (or movements) of the lever F has turned the pinion two steps, carrying the stud to the position shown in Fig. 14, and that some of the levers have, under the operations before described, been moved to their highest positions, the operations will be as follows, the means of effecting the movements of the parts being hereinafter described:

First, the frame K, carrying the pinions, is swung to carry said pinions out of engagement with the racks. Second, the lifter I will be dropped so that each of the elevated levers will fall until its shoulder d engages with the stud 29. The levers are all thus brought to one position. Third, the frame K is then swung to carry the pinions 60 into engagement with the racks of the levers F. Fourth, the retainers G are thrown back to release all the levers F, which then drop and turn back the pinions 60. Each pinion 60 turns back the number of steps its stud has been carried beyond the shoulder e, when its stud 62 will then strike the shoulder e and the movement of the pinion with that of the lever geared therewith will be arrested. As the lever F, Fig. 14, falls only the distance necessary to turn the pinion 60 two steps, the rack 25, carried by the rear end, 103, of the lever F will move only a sufficient distance to turn the registering-wheel connected therewith two steps, so that the figure exposed in position on said wheel will correspond to the number placed upon the coacting carrying-wheel. When the levers F have dropped until each pinion is at zero with its stud resting on the shoulder e of the adjacent pawl J, the total is indicated at the register, as before described. If, now, it is desired to retain this total, which I term a "sub-total," to add other numbers thereto, the pinions 60 are not retained at zero, but are left in gear with the racks as the levers F rise, so that the pinions will be turned back to the position in which they were left after the last addition and other amounts are added as before, after which the "grand total" can be taken.

The carrying of the total from a forward set of pinions to the rear register is the subject of a separate application for Letters Patent, Serial No. 195,583, and has been described only to facilitate the understanding of the general operations of the machine. In order to avoid the friction which would result from vibrating the rear ends of the levers F and turning the register-wheels when the front ends are raised under the action of the motor-springs N, which friction would necessitate the use of very stiff and powerful motor-springs, I divide each lever F into the two sections 102 103, Figs. 1, 1ª, 2, 9, and 10, the rear section, 103, being always under the lifting action of a spring, 107, Figs. 1 and 5, which tends to keep a lug, 106, on each section 103 in contact with a bearing, 105, on the section 102, extending to the rear of the shaft 1, so that the sections will normally swing together as one lever; but when the forward sections are all in the position shown in Fig. 1ª, a bar, 110, Figs. 1 and 9, is brought upon the upper edges of all the sections 103, which are depressed to carry the lugs 106 away from the bearings 105, so that each spring N can lift its co-operating lever-section without moving the section 103 and without the frictional resistance resulting therefrom. A curved spring, c, bears at one end on a bearing of the section 103 and at the other on the adjacent end of the next section 102, and tends to reduce the shock when the sections 103 descend.

The bar 110 may be carried in any suitable swinging frame. I prefer, however, to support it by arms 111, projecting from the lifter I, so that as the lifter rises at the front end to carry the levers F at their forward ends to their elevated position the bar 110 will be brought against the rear section of the levers F and depress the same.

The frame K, which carries the pinions 60, also carries a cross-bar, 112, which, when the frame K swings out, contacts with the arms 113 of the striking-levers L and carries the levers to the position shown in Fig. 13, with their studs 69 at some distance forward of the stop-detents M, in which position they are held by the pawls J, the bar 112 then returning to its first position. When a pawl, J, is moved to release a lever, L, the latter swings quickly inward, drawn by the spring 80, and acquires such a momentum by the time that the stud 69 strikes the detent M that the latter will be forcibly displaced from above the bearing 66, notwithstanding the friction resulting from the upward pressure of the motor-spring N.

In many printing-registers it is common to bring all the wheels to a printing position, but with the cipher-mark exposed on those wheels of a higher order than are needed to express the said number. Thus, if the number of wheels is six and the amount to be indicated is 621, the printed matter will be 000621, the preceding ciphers being unsightly and confusing. To avoid this, I so gear the wheels with the operating devices that the figures of the wheels are not brought into printing or visual position by the action of the actuating mechanism, but are all set a half-step from such position, and I then turn to printing or visual position only such wheels as indicate figures to be recorded. This turning of the register-wheels a half-step is effected by the upward movement of a bar, 120, Figs. 1, 2, 9, 10, and 11, carried by an arm, 121, sliding and swinging on the shaft 3. The arm 121 is a part of a frame, P, which slides on the shaft 3, said frame consisting of the arm 121, a parallel arm, 122, and a connecting-bar, 123. All parts of the frame slide back and forth laterally under the action of a spring, 126, Figs. 9 and 11, and of a cam, Q, Figs. 1, 2, and 10, secured to the rock-shaft 1 and acting on a friction-roller, 125, on the frame P, the spring pulling the frame P to the right and the cam producing the sliding movement to the left. The arm 121 has also a swinging movement independent of the remaining portion of the frame, a rib, 127, Figs. 10 and 11, on the arm 121, extending into a groove, 128, in the shaft 3, and the latter is rocked to carry the bar 120 into and from contact with the register-wheels. The sliding of the frame P carries the bar 120 into notches formed between the numbered portions of the register-wheels—that is, such wheels as are to be turned to position to record the number. Thus, if four wheels are to be moved, the bar is carried inward in the direction of the arrow to the position shown in Fig. 10 only to an extent sufficient to contact with the first four wheels; but if all are to be set into registering or printing position the bar will remain in the position shown in Fig. 2, so as to contact with all of the wheels as it rises.

It will be evident that different carriers may be employed for sliding and vibrating the bar 120.

It is of course necessary to automatically set the bar 120 in its lateral position as a result of the action of the keys. This may be effected by different adjusting means. Those shown in the drawings consist of a series of pawls, $g$, (best shown in Figs. 2, 9, 10, and 11,) each depending for its position upon that of one of the levers F, and which, when set, is in the way of a shoulder, $i$, Fig. 11, of the frame P and limits its movement. Each pawl $g$ is hung on a fixed cross bar, 130, below the projecting rear ends of the forward section, 102, on one of the levers F, in such position that when such end is depressed it contacts with the front end of the pawl and lifts its rear end; but when said rear end of the lever rises as the forward end of the lever F falls from the action of a key, the rear end of the pawl drops into position to be struck by the shoulder $i$, as shown in Figs. 9 and 11. Prior to setting up a number the frame P is in the position shown in Fig. 2, and when the levers F have been set, as a result of the manipulation of the keys and of the action of the lifter the further rocking of the shaft 1 will swing the cam Q to such a position as to permit the spring 126 to draw said frame to the right, Fig. 11, until the shoulder $i$ strikes the nearest pawl $g$ that has been dropped, said shoulder being then opposite the highest wheel that has been moved. As none of the pawls $g$ coacting with the levers F that have not been operated were dropped, the shoulder $i$ will pass beneath said pawls and the bar 120 will be carried to a position away from all the wheels except those that are to be set into visual or printing position. This position is indicated in Fig. 9, along a line, $z$. As the shaft 3 is now rocked, the bar 120 will contact with and set the opposite wheels into printing position.

To the arm 122 of the frame P is pivoted a finger, 124, the inner end of which is adjacent to that of the bar 120, but on a different horizontal plane, so that said finger is carried longitudinally by the frame P into the notches of such of the wheels as are not to make a record, and said finger 124 is acted on by a spring, 131, Fig. 10, which tends to normally throw the said finger forward toward the shaft 23 of the wheels. The said finger has a rib, $n$, at its outer edge, and has a beveled end, $m$, which, when it contacts with a beveled shoulder, $s$, on any part of the frame—as, for instance, one of the side plates, 24—will throw back said finger and bring its rib $n$ into position to print a cross-line on the paper which receives the impression from the register-wheels.

The effect of the arrangement described is to print a series of numbers and then prior to printing a total to print a line below said numbers. Said line may be printed at any time by first bringing all the levers F into position to throw the register-wheels out of printing position, which permits the frame P to slide full to the right, and then rocking the shaft 1, as described hereinafter, to effect this sliding movement of the frame.

It will be obvious that the movable line-bar may be supported by carriers of different forms operated in different ways.

*General operating mechanism.*—The parts above described are carried generally within a case, X, Fig. 1, having a slot, $u$, at the rear opposite the register-wheels, and a swinging frame, R, carries a printing roller or platen, S, against which lies the strip of paper, $V^2$, to be printed. The frame R is hung to a shaft, 405, which is rocked so as to swing the frame back while the register-wheels are being set, and then released so as to swing inward under the action of a spring, $S^3$, thereby carrying the paper, $V^2$, against an inked ribbon, 401, carried by bobbins on the shafts 8 and 9 and extending across the wheels of the register. The lower bobbin is turned by a pawl. The particular operating mechanism shown connected with the swinging frame constitutes no part of this invention; but being embodied in a separate application for Letters Patent, Serial No. 279,800, filed July 13, 1888, need not be here described, further than that the lever 135 is connected by a link, 212, with an arm carrying a pawl, 402, that engages with the peripheral teeth of the bobbin on the shaft 8, and an arm, $S^7$, connected with the lever 135, engages with a part of the frame R to thrust out the latter when the lever swings with the shaft 3.

In order to secure a total it is necessary, as before described, to permit every lever F to drop to turn back the pinions 60. As the retainers G hold up the levers, it is therefore necessary to swing such retainers backward. This is effected by moving all the slides 32 simultaneously backward, and thereby swinging the retainers G to the position shown in Fig. 13. This movement of the slides may be effected by a cross-bar, 190, Figs. 1 and 1ª, and suitable operating-connections. For instance, the bar is carried between arms 191, swinging on the shaft 4, and when the arms are swung to the reverse direction of the arrow, Fig. 1, the bar 190 contacts with lips $t^3$, at the upper ends of the slides 32, and draws them all backward. Where the operations of the machine are effected from a single treadle or lever, I combine with the bar 190 a hand-lever, $Q^2$, hung to the shaft 5 and carrying arms supporting studs $d'$, each extending through slots in the ends of two connecting-rods, 194 195, the former jointed to arms 191 and the latter to arms 196 of levers secured on the shaft 4, so that if the lever $Q^2$ is pulled forward it will draw on the rods 195 and swing the bar 190 backward, while the same result will ensue if the lever $Q^2$ is swung in the opposite direction, when the rod 194 will be pushed back and carry back the arms 191 and bar 190. The purpose of this double action will be hereinafter set forth.

I have not referred as yet to any particular mechanism for moving the rock-shafts and other parts, as different mechanisms may be employed without practically altering the main feature of the machine. I prefer, however, to use devices for operating automatically all the described parts in proper time and unison from a single operating-lever, as, for instance, a hand or foot lever.

I have shown in Fig. 3 an operating-treadle, Y, and in other figures the parts connected therewith.

The treadle or lever Y is connected to operate what I term a "driver," T, as it is the part like a driving-shaft from which all the movements are imparted to the various parts of the machine. This driver, as shown, is in the form of a slide, Figs. 1, 2, and 3, moving upon an inclined guide-rod, 155, and carrying rollers 156 that enter cam-slots 157 in cam-arms 158, attached to the rock-shaft 1, so that as the driver rises and descends the said shaft is rocked back and forth to move the levers F and frame P and the printing devices, as before described.

To the driver T is secured rigidly a cam-plate, $h$, which contacts with a roller, 167, on a lever, $k$, Figs. 1, 3, and 5, pivoted to a connecting-rod, 162, jointed to an arm, 163, pivoted on the shaft 2, which arm 163 carries the frame K. A spring, 164, tends to swing said frame backward. A link, 165, serves to guide the connecting-rod, and a spring, 166, connected to said link and to a pendent arm, $k^4$, of the lever $k$ tends to keep the latter substantially in line with the connecting-rod. As the driver T and cam $h$ rise, the cam $h$ contacts with the rear end or edge of the roller 167 of the lever $k$ and forces forward the latter and its rod 162, so as to swing forward the frame K and carry the pinions 60 out of gear with the racks just before the latter are dropped from the action of the driver in depressing the lifter. The cam $h$ rises until its lower end is just above the roller 167, and the inclined edge $q$ will permit the lever $k$ to move back in the direction of the arrow, Fig. 3, as the upward movement is completed, so that the frame K is swung to again bring the pinions into gear with the racks prior to their upward movement, which results when the driver descends. As the cam $h$ ascends, the lever $k$ is held in line with the rod 162, Figs. 1 and $1^a$, by means of a lug, 170, Fig. $1^a$, on a lever, 171, secured to the shaft 5, on which lug the front end of the lever $k$ bears; but when the cam $h$ begins to descend its pressure on the rear end of the lever $k$ tilts the latter in the direction of the arrow, Fig. $1^a$, without imparting any movement to the rod 162, so that the frame K remains at rest and the pinions 60 remain in gear with the racks during the ascent of the latter.

The last action of the machine results from depressing the driver, which is held in its lowest position prior to another operation by means of a detent, 180, Figs. 1 and $1^a$, the lower end of which engages with a shoulder, 181, on a rack, 210, connected with the driver, which is thus held down.

Prior to beginning operations the driver T must be released. I therefore connect the detent 180 with the key-board, so that after the keys have been depressed or set, prior to registering a number, and the board is pushed back, the detent will be moved to release the driver T. As shown, the connection is a pin, 201, Fig. $1^a$, on the key-board arranged to bear against the detent 180, so as to strike and vibrate the lever as the board moves back, and thus carry the end of the lever away from the shoulder 181. This locking of the driver T until the key-board is pushed back prevents the premature moving of the operating devices of the machine.

The arm 171 on the rock-shaft 5, which carries the lug 170, also carries a lug, 200, which is out of line with the lug 170, so that if the shaft 5 is turned by the lever $Q^2$, to carry the lug 200 to a position above the front end of the lever $k$, the latter is prevented from tilting on the downward movement of the cam $h$, but will slide longitudinally, swinging forward the frame K, and the carrying pinions 60 will then be swung away from the racks, as before described, as is necessary to hold the pinions 60 at zero—that is, with their studs 62 in contact with the shoulders $e$ of the pawls J—after securing a total and prior to beginning another series of additions. By manipulating the lever $Q^2$, so as to carry both lugs, 170 200, from the lever $k$, the latter will swing on both the upward and downward movements of the cam $h$, and the frame K will remain stationary with the pinions in gear with the levers F, as is necessary in securing a "sub-total."

As it is necessary for the operations described to release the levers F when the lever $Q^2$ is set in both its extreme forward and extreme backward position, I make use of the two pairs of connecting-rods 194 195 before described, which insures the backward movement of the bar 190 when the lever $Q^2$ is moved in either direction. As the movement of the lever $Q^2$ during the time of the movement of the other parts of the machine might injure the mechanism and would lead to maladjustments, I provide a lock for holding the lever automatically until it can be moved with safety. Thus I use a pawl, $R^2$, pivoted to the side frame and with three notches adapted to receive a stud, 303, on a branch of the arm 171, and this pawl rests on a stud, 204, carried by one arm, 209, of the lifter, and is held above the stud 303 thereby until the lifter begins to descend on the starting of the operations when the pawl will be allowed to drop and the stud 303 will be received into one of the notches and the lever $Q^2$ will be immovably locked in place. It is also necessary to prevent the key-board from being moved except when the other parts are at rest and in their normal positions, and I use a lock for this purpose. Thus a shoulder or stud, 206, on the key-board Fig. $1^a$ is adapted to engage with the shoulder of a bevel-ended spring-catch, 207, pivoted at $w^3$ to the frame, but the catch 207 is held out of engagement with the stud 206 by the contact of an arm, 208, secured to the spring-catch with a pin, 209, carried by the lifter, until the latter has descended a short distance, when the pin 209 will pass from the arm and the catch will engage with and lock the key-board in place.

It would be very detrimental to the operations of the machine for the operator to rock the shaft 1 a part of its movement, or lift the driver T a part of its travel, and then reverse the motion. To prevent this, I use the rack 210, Figs. 1 and 3, the teeth of which engage with a weighted pawl, V, hung at $j$ to the frame, the spaces or notches between the teeth being so shallow that after the rack has been started in one direction the pawl cannot enter far enough to permit the rack to be drawn back. At each end of the rack, however, is a notch, 211, Figs. 1 and 3, so deep that after the pawl enters the same it (the pawl) can swing to a position to permit the rack to be started in a reverse direction.

It will be evident that a self-acting pawl might be combined with any other reciprocating part of the machine, besides the rack 210, so as to prevent any return movement after the motion in either direction is begun. The pawl might be replaced by an eccentric, and the rack by a plain plate notched only at the ends.

Where the movements of a mechanical calculator are effected directly by the power of the operator, they are apt to vary in force and quickness, with a most detrimental effect upon the mechanism. To avoid this result, I combine with the machine a motor or motors, which impart the desired movements without varying either in force or speed, and the force of the operator is used only to store up the power of the motors, which may be done quickly, or otherwise, without detriment. The motor may be of any suitable character, as shown. It consists, essentially, of two springs, 215 and 220, and their connections with the driver T.

The lifting of the driver T and operations of the machine in one direction are effected by the spring 215, Fig. 3, connected to the treadle Y and to a lug on the frame, said treadle being connected by a rod, 216, to a sleeve, 217, sliding on a rod, 218, connected to the slide T and guided at the lower end. The rack 210 is connected by a rod, 300, with said sleeve, which is normally held against a stop, 219, by the spring 220, bearing on a stop, 221, at the other end of the rod, and on suitable supports at the lower end, as described hereinafter.

To prevent sudden movements of the operating devices, which would jar and strain them, I use a dash-pot, fly-wheel, or other governor, arranged in any suitable manner to limit the speed of the movements. Thus a cylinder, U, receives the piston 225 on the end of the rod 218, and a limited port, 226, with an adjusting-screw, communicates with a reservoir, 227, holding a supply of oil that flows slowly back and forth through the port as the piston rises and descends. The depressing of the treadle and descent of the connecting-sleeve 217 compresses the spring 220, which, by its expansion after the movement of the treadle is arrested, carries the rod 218 and its connections to their lowest positions. This spring exerts always a uniform power, and prevents the operator from applying such power with his foot as to force the oil rapidly through the port and strain the machine. As the rack 210 is carried by the sleeve 217, the rack will descend to the full extent when the treadle or lever is depressed to its full extent, and the treadle with the sleeve will be locked in place by the detent 180, so that if the sleeve 217 is carried downward more rapidly than the spring 220 can act to depress the rod 218 and driver T, the spring, being compressed, will act after the sleeve 217 stops its motion to gradually depress the driver after the foot is removed from the treadle. When the key-board is again pushed back, the driver is released, when the motor-spring 215 will lift the driver and parts connected therewith, and the parts of the machine will be moved to effect the registration without any other act upon the part of the operator than the moving of the key-board, so that the registration is always effected by the uniform and equal power of the motor-spring.

Fig. 3ª shows a modified governor consisting of a rack-rod, 218, for connection with the sleeve 217 and gearing with a pinion on a fan-shaft, 230, the revolution of the shaft and fan limiting the speed of movement of the rod and its connected parts.

I have shown a reciprocating driver carrying a friction-roller, 156, and cam $h$, from which all the operating movements of the machine are imparted; but it will be evident that any other form of reciprocating driver may be employed, as a block carried by a swinging arm. I include all such forms under the general designation "driver."

It will be obvious that the keys of the movable key-board may be provided with different contact devices to operate the registering mechanism when the board is moved after setting the keys. For instance, each key may be pivoted instead of sliding, and may bear at the lower end on a spring-lifted dog or contact-piece, 100, Fig. 4, to hold the latter down when the key is tilted forward, when the dog will be in position to engage with the stud 35. As the board slides forward, the keys are restored by the sliding back of bars $r$, and the dogs are all lifted by their springs to positions above the contacting studs.

It will be obvious that various other forms and arrangements of contacts set by the keys and conveying motion to the parts of the regulator may be used. The drums or spools 400 support the ink-ribbon 401, and a pawl, 402, carried by an arm, 407, is swung by the vibration of the arm 135, connected with the arm 407 by a link, 212, so as to impart an intermittent feed to the ribbon. The vibration is imparted to the arm 135 by the entrance of the pin 156 between the forks of an arm, 403, connected with the arm 135. The upper spool, 400, is turned by a reciprocating pawl, 404, engaging with a ratchet-wheel, 405, on said spool, said pawl being carried by an arm, 406, connected with the arm 135.

It will be evident that some of the devices above described may be used in connection with calculating-machines of different constructions—as, for instance, the motors, governor, keys independent of the stops while connected to operate them, &c.

Without limiting myself to the precise construction and arrangements of the parts shown and described, I claim—

1. The combination, with the register and register-actuating devices of a calculator, of a key-board capable of movement and provided with a series of adjustable keys, and movably supported upon the frame of the machine to bring the keys that have been set into operative connection with the register-actuating devices upon the movement of the board after such setting of the keys, substantially as described.

2. The combination, in a calculating-machine, of a series of register-wheels, wheel-actuating devices, a frame supporting the same, a movable key-board secured to have a limited movement on the frame, and a series of adjustable keys carried by said key-board, whereby such keys as are set by hand are brought into connection with the wheel-actuating devices on the movement of the key-board after such setting of the keys, substantially as described.

3. The combination of the register, actuating-levers F, and stops limiting the movements of said levers, with a movable key-board carrying series of adjustable keys, and connections between each stop, and one of the keys arranged to be operated by such key after it is set and upon the movement of the board, substantially as described.

4. The combination of the register, the retainers, the operating-levers, and the regulators thereof, with a movable key-board carrying series of keys, and connections between each series of keys and one of the retainers, and connections between each key and a stop of the corresponding regulator, the latter connections arranged in position to be actuated only by the keys that are set and on the movement of the board, substantially as described.

5. The combination, with the register and the actuating mechanism of a calculating-machine, of a movable key-board carrying series of adjustable operating-keys, substantially as and for the purpose set forth.

6. The combination of the register-actuating levers F, and a retainer for each lever, with a movable key-board, series of keys carried thereby, movable studs arranged to contact with such keys as have been set, and a connection between the studs of each series of keys and the retainer of the co operating lever F, substantially as described.

7. The combination, with the register-actuating devices, of a movable key-board and series of keys adjustably carried thereby to contact with said devices upon the movement of the board after the adjustment of the keys, substantially as described.

8. The combination, with the frame of the machine, register, and register-actuating devices, of a key-board sliding on said frame, and series of keys adjustably mounted upon said board, and adjustable into and out of operative relation to said devices, substantially as described.

9. The combination, in a calculating-machine, with the register and actuating devices, of the sliding key-board, series of keys, and a locking-slide to each series to hold the keys after being set in operative relation to the register-actuating devices, substantially as described.

10. The combination, with a series of keys, each having a bearing or shoulder, of a locking-slide arranged to be moved by the setting of any of the keys, and adapted to engage all of said shoulders to hold any key after it is set and until moved by the setting of another key, substantially as described.

11. The combination of a series of spring-actuated keys, a locking-slide and spring for moving the same, and a shoulder and an incline on each key, the incline arranged to bear on and force back the slide as a key is depressed until said slide engages with the shoulder and locks the key, substantially as described.

12. The combination of the movable key-board, series of keys, locking devices for holding the keys in position after they are set, and an automatic unlocking device for replacing the keys as the key-board is restored to its normal position, subtantially as described.

13. The combination, with the rack-levers having bearings, of a series of pinions having studs, a swinging frame carrying said pinions, a pawl with two shoulders, one engaging with a stud on one of the pinions, a spring-actuated lever, L, with which the other shoulder engages, and detents M engaging with the bearings on the rack-levers, and in position to contact with the levers L, substantially as described.

14. The combination, with the rack-levers and detents affording bearings therefor, of striking-levers L, pawls for holding said striking-levers out of contact with the detents, and a series of pinions gearing with the rack-levers, and each provided with a stop arranged to contact with the adjacent pawl, substantially as described.

15. The combination, with the rack-levers, actuating automatic motors and detents, and keys and register of a mechanical calculator, of spring-actuated striking-levers for operating said detents, substantially as described.

16. The combination, in a mechanical calculator having a rack-lever, keys, and a register, and with a detent for restraining the movement of the rack-lever, of a striking-lever, a detent for holding it back, and releasing mechanism, substantially as described.

17. The combination, with the rack-levers and the carrying-pinions, of detents affording bearings for said levers, striking-levers, and actuating-springs, pawls for normally holding the striking-levers out of contact with said detents, and studs on the pinions arranged to contact with the pawls, substantially as described.

18. The combination, with the detents, the striking-levers, springs, and pawls for holding the levers away from the detents, of studded pinions for moving the pawls to release the striking-levers, and a movable resetting-bar arranged to contact with all of said levers, substantially as described.

19. The combination, in a calculating-machine having register-wheels, of levers F, each consisting of two sections jointed to permit a limited play of one in respect to the other, the rear section in gear with the wheels of the register, a spring tending to maintain a bearing of one section against a bearing of the other, a movable bar for swinging the rear sections to carry the bearings out of contact, and a lifter provided with motor-springs for operating the forward sections of the levers, substantially as described.

20. The combination, with the register and jointed rack-operating levers F of a calculating-machine, of pivoted side arms carrying a cross-bar, 45, for elevating the front ends of the levers, and also carrying a cross-bar, 110, for depressing the rear sections of the levers, substantially as described.

21. The combination, with a mechanical calculator having a movable key-board and with an operating-driver, T, of a detent for holding the driver in an inoperative position, and connections between the detent and the movable key-board, whereby the detent is displaced as the key-board is moved after setting its keys, substantially as set forth.

22. The combination, with the registers, pinions 60, frame K, and reciprocating cam $h$, of a rod, 162, a lever, $k$, pivoted thereto, and a spring for holding it in its normal position, a movable arm, Q, and the arm 171, provided with lugs 170 200, adapted to be brought, respectively, below and above one end of the lever, according to the position of said arm, substantially as set forth.

23. The combination, with the keys, register-wheels, and rack-levers F, of a movable frame carrying a series of pinions, 60, intermediate frame-adjusting devices, and a lever, $Q^2$, connected with the adjusting devices of said frame to regulate the position of the frame, substantially as set forth.

24. The combination, in a calculating-machine and with the register, operating devices, keys, and movable key-board carrying said keys, of a lock holding said key-board in place, and connections between the lock and a movable part of the machine for holding the lock in place until all parts of the machine are in their normal position, substantially as set forth.

25. The combination, with a calculating-machine, its actuating-lever, driver, and parts carried therewith, of a pawl bearing on one of the moving parts to permit a return movement after a movement is begun in either direction, and devices, substantially as described, for reversing the pawl and throwing it out of retaining action at the limit of each movement, substantially as described.

26. The combination, with a calculating-machine having keys and a register and intermediate connections, of a driver, a reciprocating rack connected with the driver and having shallow teeth or notches along its length and deeper notches at the ends, and a reversible pawl adapted to said rack, substantially as set forth.

27. The combination, with keys, registers, intermediate connections, and the operating-driver of a calculating-machine, of a spring connected to move the driver in one direction, a treadle to move the driver in the opposite direction, and intermediate yielding spring-connections between the treadle and driver, substantially as set forth.

28. The combination, with the calculating-machine having keys, a register, connections, and an operating-treadle and motor, of a detent for locking the treadle in its position after the power is stored in the motor, and detent-releasing devices, whereby the detent is withdrawn when the motor power is required, substantially as set forth.

In testimony whereof I have signed my name to this specification in the presence of two subscribing witnesses.

WILLIAM S. BURROUGHS.

Witnesses:
CHARLES E. FOSTER,
J. S. BARKER.